US012736410B2

(12) United States Patent
Li

(10) Patent No.: US 12,736,410 B2
(45) Date of Patent: Sep. 15, 2026

(54) ROASTING PROBE

(71) Applicant: Shenzhen ElinkThings Co., Ltd, Shenzhen (CN)

(72) Inventor: Zhen Li, Shenzhen (CN)

(73) Assignee: Shenzhen ElinkThings Co., Ltd, Shenzhen (CN)

( * ) Notice: Subject to any disclaimer, the term of this patent is extended or adjusted under 35 U.S.C. 154(b) by 298 days.

(21) Appl. No.: 18/600,284

(22) Filed: Mar. 8, 2024

(65) Prior Publication Data

US 2025/0216269 A1 Jul. 3, 2025

(30) Foreign Application Priority Data

Dec. 29, 2023 (CN) ........................ 202323661614.8

(51) Int. Cl.
*G01K 1/024* (2021.01)
*G01K 7/22* (2006.01)

(52) U.S. Cl.
CPC ............... *G01K 1/024* (2013.01); *G01K 7/22* (2013.01)

(58) Field of Classification Search
CPC G01K 1/024; G01K 1/14; G01K 7/22; G01K 2207/06
See application file for complete search history.

(56) References Cited

U.S. PATENT DOCUMENTS 11,733,104 B1 * 8/2023 Zhu .......................... G01K 1/14 374/194
2022/0333997 A1 * 10/2022 Newhouse ............... G01K 1/12
2023/0176007 A1 * 6/2023 West ........................ G01K 1/08 73/31.05
2024/0175761 A1 * 5/2024 Cheng .................... G01K 1/024
(Continued)

FOREIGN PATENT DOCUMENTS

CA 3186878 A1 * 12/2023 ............. G01K 1/024
CN 112629686 A * 4/2021 ........... H02G 3/0462
CN 113280939 A * 8/2021 ............... G01K 7/42
(Continued)

OTHER PUBLICATIONS

Computer translation of WO_2024168897_A1 (Year: 2026).*
(Continued)

*Primary Examiner* — Randy W Gibson
(74) *Attorney, Agent, or Firm* — Westbridge IP LLC

(57) ABSTRACT

A roasting probe includes a probe head tube, a circuit board, a NTC thermistor, an antenna and a holding tube. The probe head tube includes a connection tube and a probe pin tube. The probe pin tube includes a shrunk portion, a transition portion and a cone-shaped portion that are consequently connected. The shrunk portion is connected to connection tube. The circuit board is provided with a limit part and is limited and provided in connection tube. An end of the circuit board away from probe pin tube is provided with a communication circuit. The NTC thermistor is connected to
(Continued)

an end of circuit board facing probe pin tube and located inside transition section. The holding tube is made of ceramic and detachably provided at an end of connection tube away from probe pin tube. The antenna is electrically connected to communication circuit and located inside holding tube.

10 Claims, 9 Drawing Sheets

(56) References Cited

U.S. PATENT DOCUMENTS

2025/0327707 A1* 10/2025 Zeng .................... G01K 1/024

FOREIGN PATENT DOCUMENTS

CN 117109755 A * 11/2023 ............ G01K 1/024
EP 4040124 A1 * 8/2022 ............... G01K 1/08
EP 4102197 A1 * 12/2022 ............ G01K 1/024
LU 507374 B1 * 10/2025 ............... G01K 1/08
WO WO-2023240834 A1 * 12/2023 ............ G01K 1/024
WO WO-2024168897 A1 * 8/2024 ............... H01Q 1/48

OTHER PUBLICATIONS

Computer translation of CN_117109755_A (Year: 2026).*
Computer translation of WO_2023240834_A1 (Year: 2026).*
Computer translation of CN_113280939_A (Year: 2026).*
Computer translation of CN_112629686_A (Year: 2026).*

* cited by examiner

ROASTING PROBE

CROSS-REFERENCE TO RELATED APPLICATIONS

This application claims priority to Chinese Patent Application No. 202323661614.8, filed on Dec. 29, 2023, the entire content of which is incorporated herein by reference.

TECHNICAL FIELD

The present application relates to the technical field of temperature sensor, and in particular to a temperature detection device.

BACKGROUND

Nowadays, foods, especially meats, are usually roasted in an oven with a corresponding fixed procedure, and different kinds of food are treated with different procedures. However, those procedures are basic procedures of oven, and the degree of doneness of foods cannot be accurately grasped, so people often determine whether foods are completely roasted by inserting a food temperature probe into foods.

However, when a conventional temperature detection device is knocked or falls over, the circuit board inside it will easily wobble, the inside circuit board will be easily damaged, and the service life of the temperature detection device is therefore reduced.

SUMMARY

A main objective of the present application is to provide a temperature detection device, aiming to improve the stability of the circuit board and prolong the service life of the temperature detection device.

To achieve this objective, the temperature detection device proposed in the present application includes a probe head tube, a circuit board, a negative temperature coefficient (NTC) thermistor, an antenna and a holding tube. The probe head tube includes a connection tube and a probe pin tube. The probe pin tube includes a shrunk portion, a transition portion and a cone-shaped portion that are consequently connected. The shrunk portion is connected to the connection tube. The circuit board is provided with a limit part, and is limited and provided in the connection tube. An end of the circuit board away from probe pin tube is provided with a communication circuit. The NTC thermistor is connected to an end of circuit board facing probe pin tube and located inside transition section. The holding tube is made of ceramic and detachably provided at an end of the connection tube away from the probe pin tube. The antenna is electrically connected to the communication circuit and located inside the holding tube.

In an embodiment, the limit part includes a first limit part, a second limit part and a third limit part. The first limit part, the second limit part and the third limit part are configured to limit the circuit board in a width direction, a thickness direction and a length direction of the circuit board, respectively.

In an embodiment, the first limit part is a first limit protrusion, and the third limit part is a third limit protrusion.

In an embodiment, the circuit board includes a first circuit section and a second circuit section. The NTC thermistor is connected to the first circuit section, and the communication circuit is provided at the second circuit section. A width of the first circuit section is less than a width of the second circuit section. Where the first circuit section and the second circuit section are connected is formed with the third limit protrusion. The first limit protrusion is provided at the first circuit section. The sum of a width of the first limit protrusion and the width of the first circuit section is less than an inner diameter of the connection tube. The width of the second circuit section is greater than the inner diameter of the connection tube.

In an embodiment, two sides of the first circuit section are both provided with one first limit protrusion, so that the first circuit section and an inner wall of the connection tube are spaced apart.

In an embodiment, the second limit part is configured as two first elastic sheets, and the two first elastic sheets are connected to two sides of the circuit board in the thickness direction, respectively. Both the two first elastic sheets are configured to abut against an inner wall of the connection tube when the circuit board is provided inside the connection tube.

In an embodiment, the temperature detection device further includes a thermal insulation rubber ring, which is provided around the circuit board and located between the NTC thermistor and the communication circuit.

In an embodiment, the temperature detection device further includes a positive screw. The positive screw is connected to an end of the holding tube away from the probe head tube, and the circuit board is provided with a charging circuit. The positive screw is electrically connected to the charging circuit of the circuit board when the holding tube is installed to the probe head tube.

In an embodiment, the temperature detection device further includes a contact pin. One end of the contact pin is provided with a first slot, and the other end of the contact pin is provided with a connection protrusion. The circuit board is provided with a second slot, and an end of the positive screw facing the probe head tube is provided with a connection recess. The first slot is inserted to the second slot to be electrically connected to the charging circuit, and the connection protrusion is configured to abut against a recess wall of the connection recess when the holding tube is installed to the probe head tube.

In an embodiment, the temperature detection device further includes a main control circuit, a first temperature sampling circuit and a second temperature sampling circuit. The main control circuit, the first temperature sampling circuit and the second temperature sampling circuit are provided at the circuit board. Multiple NTC thermistors are provided, and the multiple NTC thermistors include a first NTC thermistor and a second NTC thermistor. The first temperature sampling circuit is electrically connected to the main control circuit and the first NTC thermistor. The second temperature sampling circuit is electrically connected to the main control circuit and the second NTC thermistor.

In the technical solution of the present application, the temperature detection device includes the probe head tube, the circuit board, the NTC thermistor, the antenna and the holding tube. The probe head tube includes the connection tube and the probe pin tube. The probe pin tube includes the shrunk section, the transition section and the cone-shaped section that are consequently provided. The shrunk section is connected to the connection tube. An end of the circuit board away from the probe pin tube is provided with the communication circuit. The NTC thermistor is connected to an end of the circuit board facing the probe pin tube, and is located inside the transition section. The antenna is electrically connected to the communication circuit. When the temperature detection device is inserted into items such as roast meat, roast fish or roast vegetable, the NTC thermistor detects the temperature of items to be detected, the temperature is displayed on a display device by the antenna and the communication circuit, and the user can clearly know whether the item to be detected is completely roasted. Meanwhile, the communication circuit is provided at the end away from the probe pin tube, the antenna is electrically connected to the communication circuit, and the antenna is located inside the holding tube, which is made of ceramic; thus, not only the heat amount transmitted from the probe pin tube to the communication circuit is reduced, but also the problem that metal tube blocks the Bluetooth signal is avoided, and the effective Bluetooth work range is thus improved. Additionally, the holding tube is made of ceramic, and the holding tube is detachably installed to the end of the connection tube away from the probe pin tube, which reduces the heat amount transmitted from the probe pin tube to the holding tube, which is convenient for users to measure. Moreover, the circuit board is provided with a limit part, the circuit board is limited and installed to the connection tube by the limit part. The stabilization of the circuit board is improved by the limit part, and the possibility that the circuit board wobbles after being knocked is reduced, and the service life of the temperature detection device is therefore prolonged.

BRIEF DESCRIPTION OF THE DRAWINGS

In order to more clearly illustrate the technical solutions in the embodiments of the present application or in the related art, the accompanying drawings that are needed to illustrate the embodiments and the related art are simply introduced below. Obviously, the accompanying drawings introduced below are just some of the embodiments in the present application. For those of ordinary skill in the art, other drawings can be further obtained without creative efforts according to the structures shown in these drawings.

The realization of purposes, functional features and advantages will be further illustrated in conjunction with the embodiments and with reference to the drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all the embodiments of the present application. All other embodiments obtained by those of ordinary skill in the art based on the embodiments of the present application without creative efforts should fall within the scope of the present application.

It should be noted that all the directional indications (such as up, down, left, right, front, rear, etc.) in the embodiments of the present application are only used to explain the relative positional relationship, movement, or the like of the components in a certain posture. If the posture changes, the directional indication will change accordingly.

In the present application, unless otherwise specifically specified and limited, the terms “connected”, “fixed”, etc. should be understood in a broad sense, for example, “fixed” can be a fixed connection, a detachable connection, or be integrated as a whole; “connected” can be a mechanical connection or an electrical connection; can be directly connected, or indirectly connected through an intermediate medium, or can be the internal communication between two elements or the interaction relationship between two elements. For those of ordinary skill in the art, the specific meaning of the above-mentioned terms in the present application can be understood according to specific situations.

Besides, the descriptions associated with, “first” and “second”, etc. in the present application are merely for descriptive purposes, and cannot be understood as indicating or suggesting relative importance or implicitly indicating the number of the indicated technical feature. Therefore, the feature associated with “first” or “second” can expressly or implicitly include at least one such feature. Moreover, the meaning of “and/or” appearing in the present application includes three parallel scenarios. For example, “A and/or B” includes only A, or only B, or both A and B. In addition, the technical solutions of the various embodiments can be combined with each other, but the combinations must be based on the realization of those of ordinary skill in the art. When the combination of technical solutions is contradictory or cannot be achieved, it should be considered that such a combination of technical solutions does not exist, nor does it fall within the scope of the present application.

Figure 1:
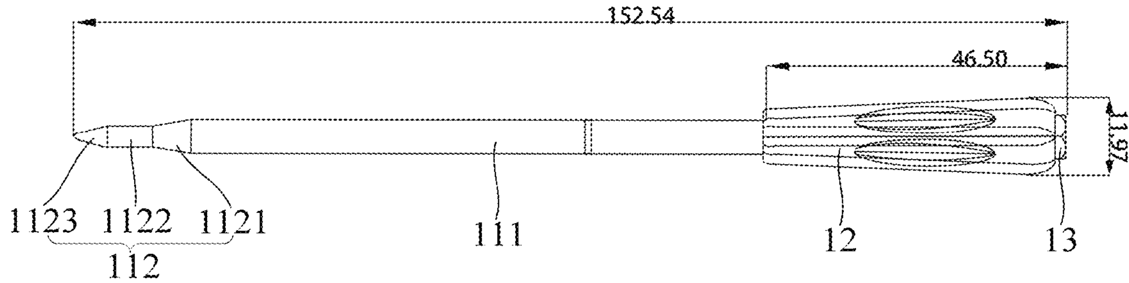
FIG. 1 is a schematic structural view of a temperature detection device according to an embodiment of the present application.
Figure 2:
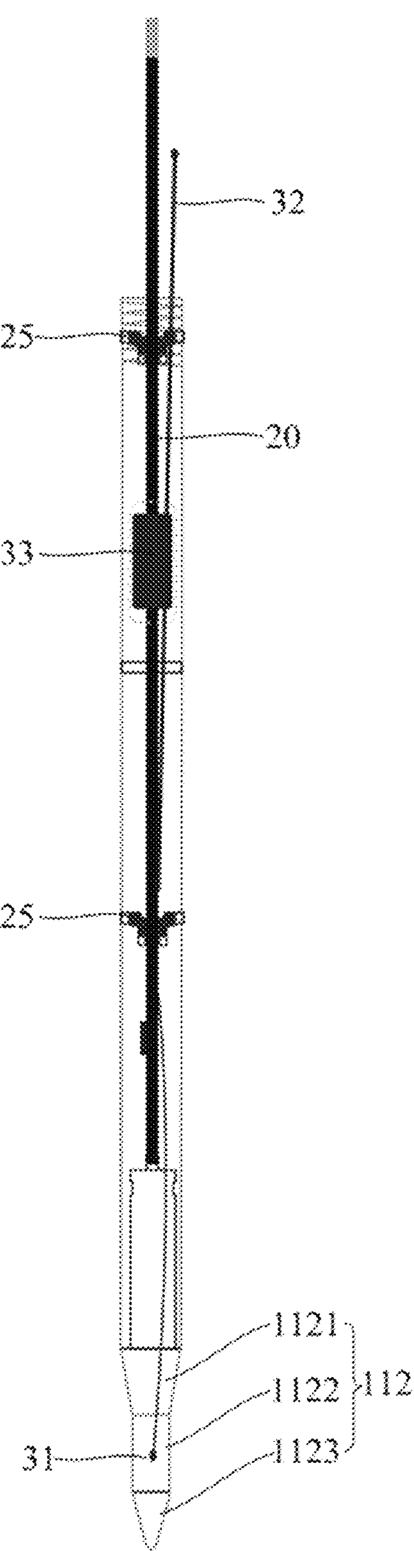
FIG. 2 is a dioramic view of part of the structure in FIG. 1.
Figure 3:
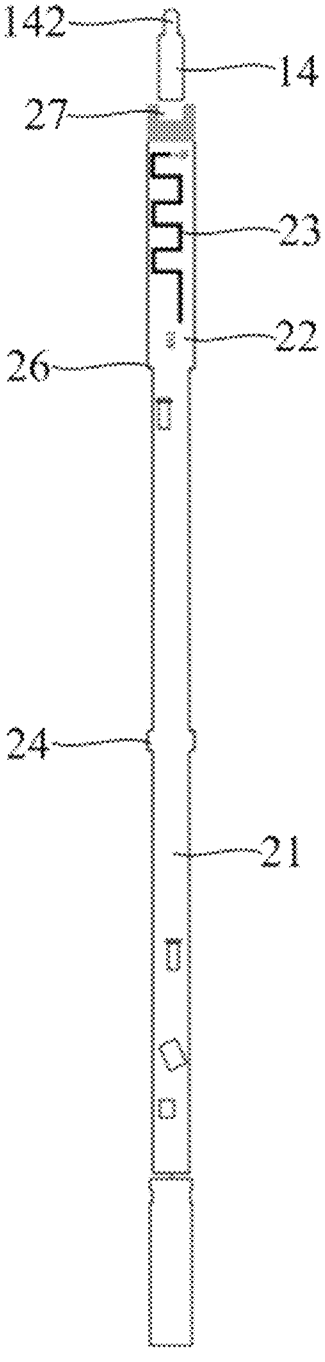
FIG. 3 is a schematic structural view of the circuit board and contact pin in FIG. 1.

Referring to FIGS. 1 to 3, the present application proposes a temperature detection device, which includes a probe head tube 11, a circuit board 20, a negative temperature coefficient (NTC) thermistor, a holding tube 12, and an antenna 32. The probe head tube 11 includes a connection tube 111 and a probe pin tube 112. The probe pin tube 112 includes a shrunk section 1121, a transition section 1122 and a cone-shaped section 1123 that are consequently connected. The shrunk section 1121 is connected to the connection tube 111. The circuit board 20 is provided with a limit part. The circuit board 20 is limited and installed to the connection tube 111 through the limit part. An end of the circuit board 20 away from the probe pin tube 112 is provided with communication circuit 23. The NTC thermistor is connected to an end of the circuit board 20 facing the probe pin tube 112, and is located inside the transition section 1122. The holding tube 12 is made of ceramic. The holding tube 12 is detachably installed to an end of the connection tube 111 away from the probe pin tube 112. The antenna 32 is electrically connected to the communication circuit 23. The antenna 32 is located inside the holding tube 12.

In the technical solution of the present application, the temperature detection device includes the probe head tube 11, the circuit board 20, the NTC thermistor, the antenna 32 and the holding tube 12. The probe head tube 11 includes the connection tube 111 and the probe pin tube 112. The probe pin tube 112 includes the shrunk section 1121, the transition section 1122 and the cone-shaped section 1123 that are consequently provided. The shrunk section 1121 is connected to the connection tube 111. An end of the circuit board away from the probe pin tube 112 is provided with the communication circuit 23. The NTC thermistor is connected to an end of the circuit board facing the probe pin tube 112, and is located inside the transition section 1122. The antenna 32 is electrically connected to the communication circuit 23. When the temperature detection device is inserted into items such as roast meat, roast fish or roast vegetable, the NTC thermistor detects the temperature of items to be detected, the temperature is displayed on a display device by the antenna 32 and the communication circuit 23, and the user can clearly know whether the item to be detected is completely roasted. Meanwhile, the communication circuit 23 is provided at the end away from the probe pin tube 112, the antenna 32 is electrically connected to the communication circuit 23, and the antenna 32 is located inside the holding tube 12, which is made of ceramic; thus, not only the heat amount transmitted from the probe pin tube 112 to the communication circuit 23 is reduced, but also the problem that metal tube blocks the Bluetooth signal is avoided, and the effective Bluetooth work range is thus improved. Additionally, the holding tube 12 is made of ceramic, and the holding tube 12 is detachably installed to the end of the connection tube 111 away from the probe pin tube 112, which reduces the heat amount transmitted from the probe pin tube 112 to the holding tube 12, which is convenient for users to measure. Moreover, the circuit board 20 is provided with a limit part, the circuit board 20 is limited and installed to the connection tube 111 by the limit part. The stabilization of the circuit board 20 is improved by the limit part, and the possibility that the circuit board 20 wobbles after being knocked is reduced, and the service life of the temperature detection device is therefore prolonged.

Since the cone-shaped section 1123 is of a sharp portion for inserting into foods, and in order to prevent the cone-shaped section 1123 from being deformed when inserting into foods, in an embodiment, the cone-shaped section 1123 is solid, or the thickness of the cone-shaped section 1123 is greater than that of the transition section 1122 or the shrunk section 1121. In such cases, the NTC thermistor needs to be provided inside the transition section 1122.

In an embodiment, the limit part includes a first limit part, a second limit part and a third limit part. The first limit part, the second limit part and the third limit part are used for limiting the circuit board 20 in the width direction, the thickness direction and the length direction, respectively. In this way, the circuit board 20 is limited in multiple directions, the stabilization of the circuit board 20 is further improved, and the service life of the temperature detection device is thus prolonged.

Figure 4:
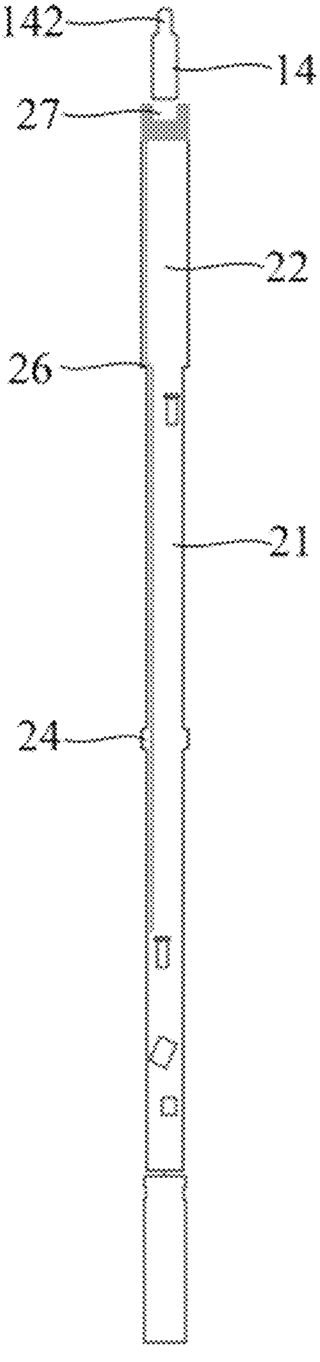
FIG. 4 is another schematic structural view of the circuit board and contact pin in FIG. 1.
Figure 5:
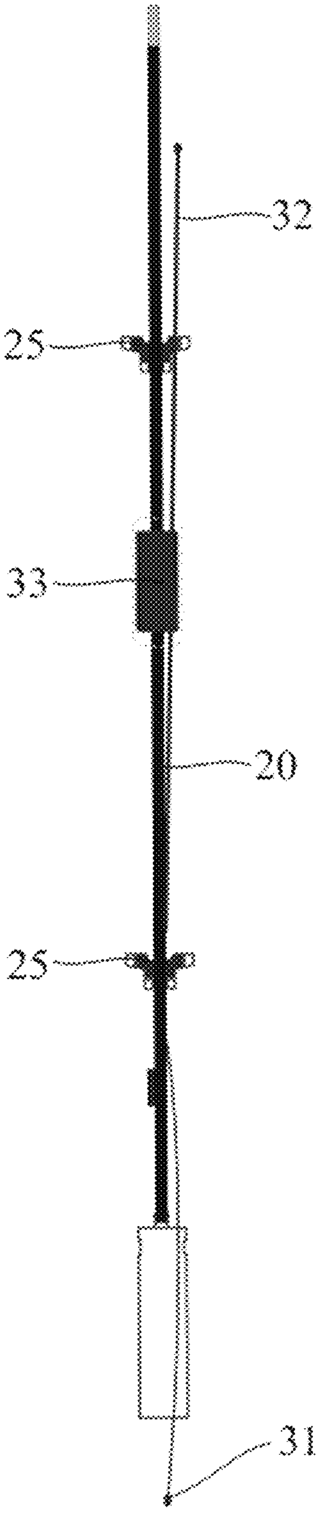
FIG. 5 is a side view of the circuit board in FIG. 1.
Figure 6:
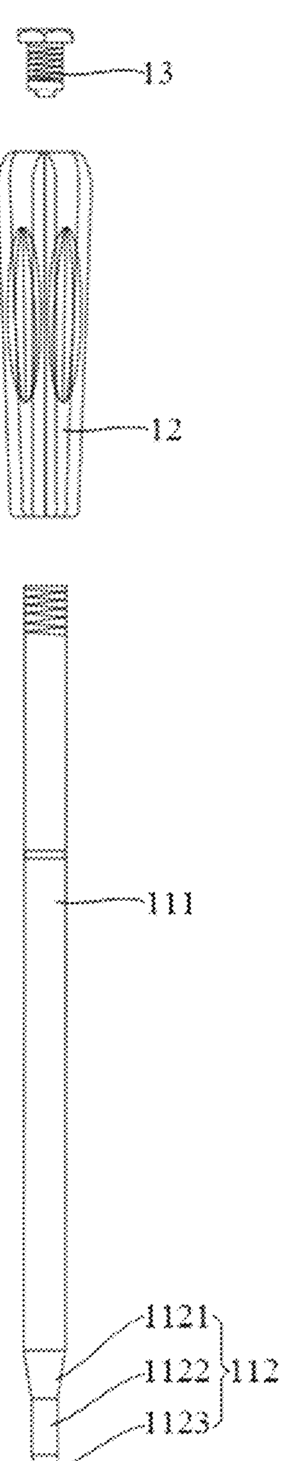
FIG. 6 is an exploded view of part of the structure in FIG. 1.
Figure 7:
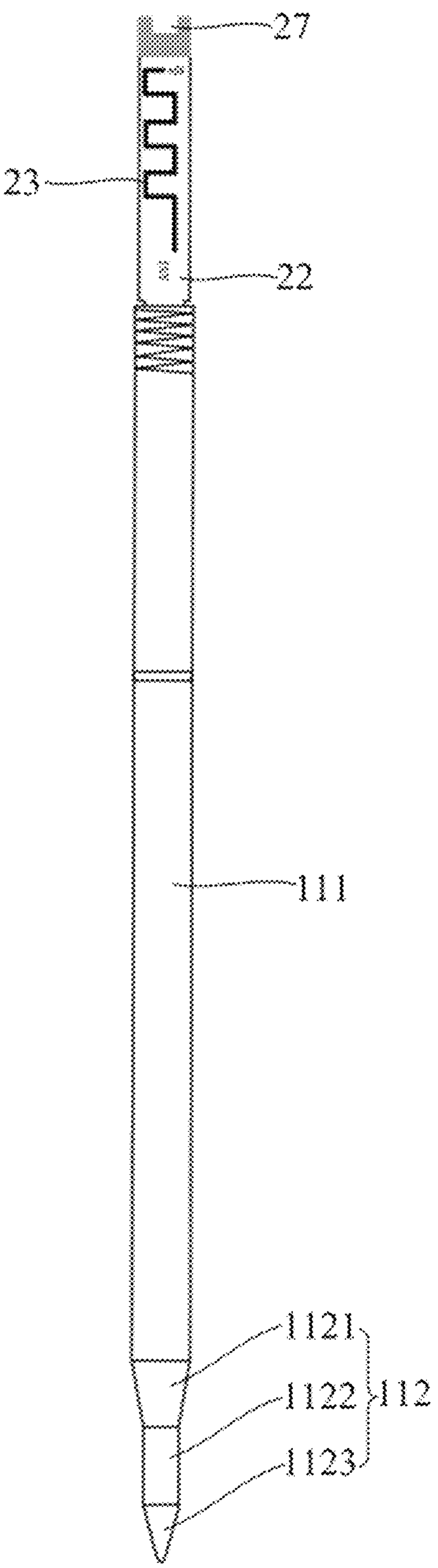
FIG. 7 is a schematic structural view of part of the structure in FIG. 1.
Figure 8:
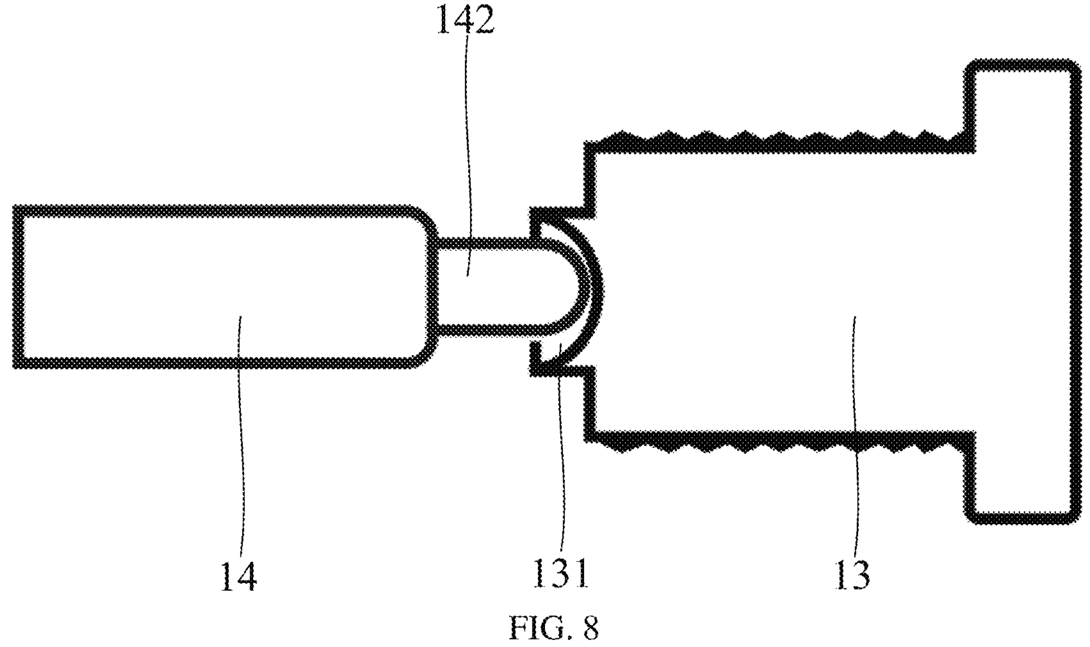
FIG. 8 is a schematic structural view of the contact pin and positive screw in FIG. 1.

Referring to FIGS. 3 to 5, in an embodiment, the first limit part is the first limit protrusion 24, the third limit part is the third limit protrusion 26. In other embodiments, the first limit part and/or the third limit part can be metal domes, limit boards and so on.

In an embodiment, the circuit board 20 includes a first circuit section 21 and a second circuit section 22. The NTC thermistor is connected to the first circuit section 21, the communication circuit 23 is provided at the second circuit section 22. The width of the first circuit section 21 is less than the width of the second circuit section 22. Where the first circuit section 21 and the second circuit section 22 are connected is formed with the third limit protrusion 26. The first limit protrusion 24 is provided at the first circuit section. The sum of the width of the first limit protrusion 24 and the width of the first circuit section 21 is less than the inner diameter of the connection tube 111. In this way, the first circuit section 21 is located inside the connection tube 111, the second circuit section is not located inside the connection tube 111, and the communication circuit 23 is provided at the second circuit section 22, thus the heat amount transmitted from the probe pin tube 112 to the communication circuit 23 is further reduced, the stabilization of the circuit board 20 is thus improved, and the measurement precision of the temperature detection device is thus improved.

Since both the connection tube 111 and the probe pin tube 112 are made of thermally conductive materials, after the probe pin tube 112 is inserted into the roast meat, a large amount of heat is still transmitted to the connection tube 111. Therefore, if the circuit board 20 is in direct contact with the connection tube 111, a large amount of heat will be transmitted to the circuit board 20, which affects the operation of the circuit board 20 and reduces the service life of the circuit board 20. Therefore, in an embodiment, both sides of the first circuit section 21 are provided one first limit protrusion 24, to allow the first circuit section 21 and the inner wall of the connection tube 111 to be spaced apart. By providing the first limit protrusion 24 on two opposite sides of the first circuit section 21, the first circuit section 21 and the inner wall of the connection tube 111 are allowed to be spaced apart, the heat amount transmitted from the connection tube 111 to the circuit board 20 is greatly reduced, the precision of the temperature detection device is improved, and the service life of the temperature detection device is prolonged.

In an embodiment, the second limit part is configured to be two first elastic sheets 25. The two first elastic sheets 25 are respectively connected to two sides of the circuit board 20 in the thickness direction. When the circuit board 20 is installed in the connection tube 111, both the two first elastic sheets 25 abut against the inner side wall of the connection tube 111. The first circuit section 21 is limited in the thickness direction by the two first elastic sheets 25; meanwhile, the first circuit section 21 and the connection tube 111 are arranged spaced apart by providing the first elastic sheet 25 at both two sides of the first circuit section 21 in the thickness direction, which ensures the normal operation of the circuit board 20, improves the precision of the temperature detection device and prolongs the service life of the temperature detection device.

In addition, the number of the first elastic sheet can be greater than two, such as four or six. Every two first elastic sheets are provided at two sides of the circuit board in the thickness direction, and multiple first elastic sheets are arranged spaced apart. In this way, the stabilization of the circuit board is improved.

In an embodiment, the temperature detection device further includes a thermal insulation rubber ring 33. The thermal insulation rubber ring 22 is installed around the circuit board 20 and located between the NTC thermistor and the communication circuit 23. In this way, the heat amount transmitted from the NTC thermistor to the communication circuit 23 is further reduced by the thermal insulation rubber ring 33, which improves the precision of the temperature detection device and prolongs the service life of the temperature detection device. In addition, the thermal insulation rubber ring 33 also plays the role of filling the space between the circuit board 20 and the connection tube 111, which not only limits the circuit board 20, but also reduces the heat amount transmitted from the connection tube 111 to the circuit board 20, thereby improving the precision of the temperature detection device and prolonging the service life of the temperature detection device.

Referring to FIGS. 3 to 8, in an embodiment, the temperature detection device further includes a positive screw 13. The positive screw 13 is connected to an end of the holding tube 12 away from the probe head tube 11. The circuit board 20 is provided with charging circuit. When the holding tube 12 is installed to the probe head tube 11, the positive screw 13 and the charging circuit of the circuit board 20 are electrically connected. The positive screw 13 serves as the positive pole, and the probe head tube 11 serves as the negative pole, thus the temperature detection device can be charged, and the endurance of the temperature detection device is enhanced.

In an embodiment, the temperature detection device further includes a contact pin 14. One end of the contact pin 14 is provided with a first slot, and the other end of the contact pin 14 is provided with a connection protrusion 142. An end of the positive screw 13 facing the probe head tube 11 is provided with a connection recess 131. The first slot is inserted into the second slot 27 to be electrically connected to the charging circuit. When the holding tube 12 is installed to the probe head tube 11, the connection protrusion 142 abuts against the recess wall of the connection recess 131. By providing the contact pin 14, the stability of the electrical connection between the circuit board 20 and the positive screw 13 is improved, thus the possibility of charging failure is reduced, and the user's experience is improved.

In an embodiment, the charging circuit is positioned at one side of the circuit board 20, while the communication circuit 23 is positioned at the other side of the circuit board 20. In this way, the width of the circuit board can be reduced, which facilitates the miniaturization of the temperature detection device.

In an embodiment, an end of the connection section away from the probe head section is provided with external thread, the holding tube 12 is provided with internal thread, and the holding tube 12 and the connection section are in threaded connection via the cooperation of internal thread and external thread. The threaded connection is simple, which does not need other fitting tools and has low manufacturing cost. Meanwhile, the sealing performance of threaded connection is good; when using the temperature detection device to measure the temperature of roasted meat, grease and oil smoke from roasted meat will inevitably rub off on the connection tube 111 and the probe pin tube 112. If the sealing performance between the holding tube 12 and the probe head tube 11 is not good enough, the grease and smoke will easily enter the connection tube 111, which will affect the normal operation of the circuit board 20 inside the connection tube 111. On the other hand, the inside of the probe head tube 11 is too narrow to clean. Therefore, the threaded connection of the holding tube 12 and the connection section improves the sealing performance, which reduces entered grease and smoke, thus the stability of the circuit board is improved.

In an embodiment, the total length of the temperature detection device is 152.54 mm, the total length of the holding tube 12 is 46.5 mm, and the maximum diameter of the holding tube 12 is 11.97 mm.

In an embodiment, the temperature detection device further includes a main control circuit, a first temperature sampling circuit and a second temperature sampling circuit that are provided at the circuit board. Multiple NTC thermistors are provided, which includes first NTC thermistor and second NTC thermistor. The first temperature sampling circuit is electrically connected to the main control circuit and the first NTC thermistor. The second temperature sampling circuit is connected to the main control circuit and the second NTC thermistor.

Figure 9:
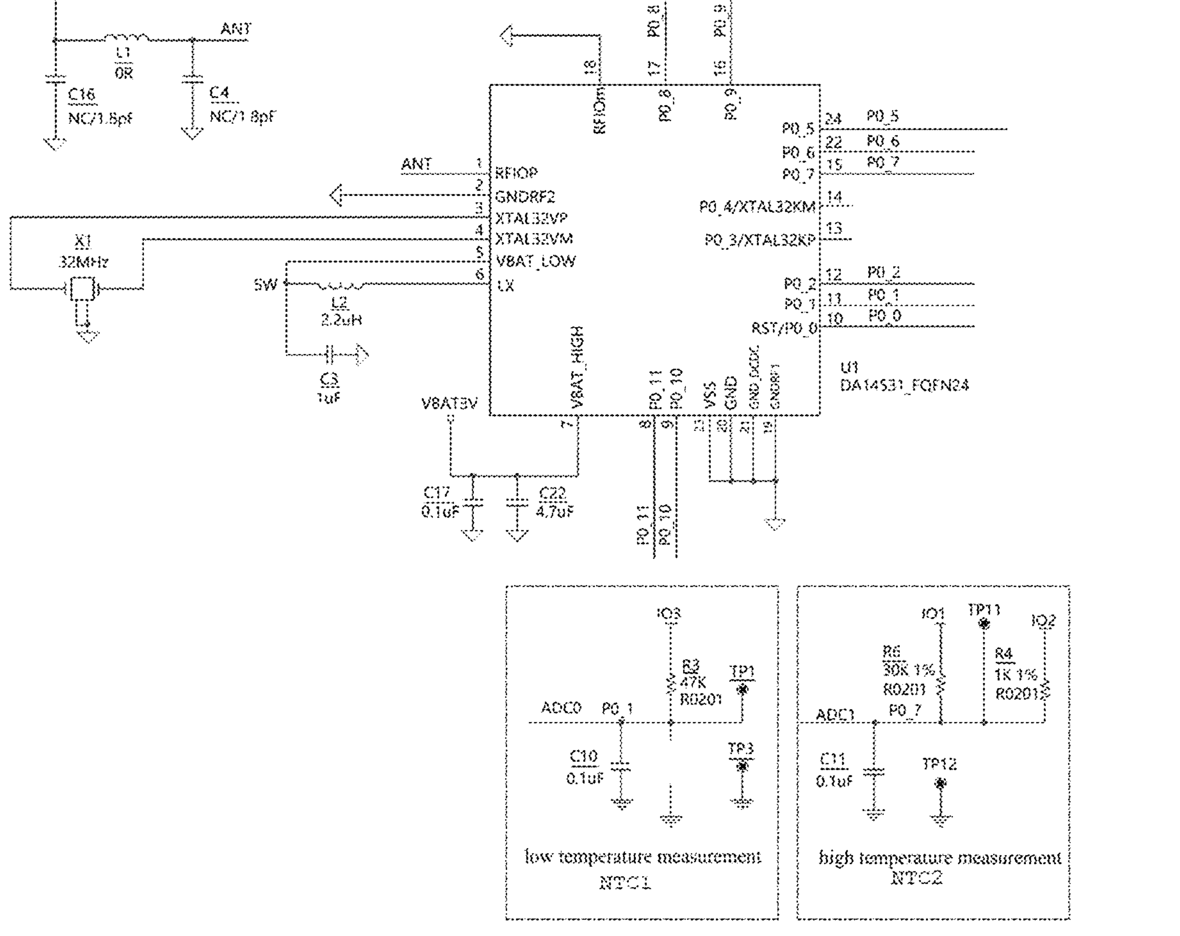
FIG. 9 is a circuit diagram of the circuit board inside the temperature detection device of the present application.

It can be understood that the precise detection range of voltage of the ADC (analog-digital conversion) port of the main controller in the main control circuit is limited, so for the purpose of ensuring the precision of detection of the NTC thermistor under different temperature conditions, in this embodiment, referring to FIG. 9, the main control circuit includes a main controller, the first temperature sampling circuit includes a third resistor R3, a first connection port TP1, a third connection port TP3, a third power port IO3, and a tenth capacitor C10. The first power port IO3 is electrically connected to the main controller. The first power port IO3 is connected to a first terminal of the third resistor R3. A second terminal of the third resistor R3, a first terminal of tenth capacitor C10 and the first connection port TP1 are connected to the first ADC port, which is ADC0, of the main controller. The third connection port TP3 and a second terminal of tenth capacitor C10 are grounded. The second temperature sampling circuit includes a sixth resistor R6, a fourth resistor R4, an eleventh capacitor C11, a first power port IO1, a second power port IO2, an eleventh connection port TP11 and a twelfth connection port TP12. The first power port IO1 is electrically connected to one terminal of the main controller, the second power port IO2 is electrically connected to another terminal of the main controller. The first power port IO1 is connected to a first terminal of sixth resistor R6. The second power port IO2 is connected to a first terminal of fourth resistor R4. The eleventh connection port TP11, a second terminal of sixth resistor R6, a second terminal of fourth resistor R4, a first terminal of eleventh capacitor C11 are connected to the second ADC port, which is ADC1, of the main controller. A second terminal of eleventh capacitor C11 and the twelfth connection port TP12 are grounded. The first connection port TP1 and the third connection port TP3 are used for connecting two terminals of the first NTC thermistor. The eleventh connection port TP11 and the twelfth connection port TP12 are used for connecting two terminals of the second NTC thermistor. In some embodiments, the resistance of the third resistor R3 is 47K, the resistance of the fourth resistor R4 is 1K, the resistance of the sixth resistor R6 is 30K. The first NTC thermistor and the second NTC thermistor can be of the same type or not.

Specifically, in practical operation process, when it needs to take a low temperature measurement, such as the temperature is below −10 degrees Celsius, the main controller will output high voltage level through IO3, set IO2 and IO1 high impedance state, determine the current resistance of the first NTC thermistor according to the value of high voltage level and the resistance of third resistor and the voltage detected by ADC0, and determine the current temperature according to a prestored NTC thermistor resistance-temperature mapping table.

When it needs to take a high temperature measurement, such as the temperature is higher than −10 degrees Celsius and lower than 100 degrees Celsius, the main controller will output high voltage level through IO1, set IO2 and IO3 high impedance state, determine the resistance of the second NTC thermistor and then determine the temperature according to the voltage detected by ADC1 and the resistance of resistor R6 and the value of high voltage level output through IO1 with the above-mentioned same procedure. When the current temperature is higher than 100 degrees Celsius but lower than 270 degrees Celsius, the main controller will output high voltage level through IO2, set IO1 and IO3 high impedance state, and determine the resistance of the second NTC thermistor and then determine the temperature according to the voltage detected by ADC1 and the resistance of resistor R4 and the value of high voltage level output through IO2 with the above-mentioned same procedure. It can be understood that if the current temperature to be measured ranges from 100 to 270 degrees Celsius, it is also possible to output high voltage level through IO1 and IO2 at the same time and proceed the above-mentioned procedure. In this way, even if in different temperature measurement ranges, the voltage detected by the ADC port of the main controller is still kept in its detectable range, thus the precision of detection is ensured.

The above-mentioned are only some embodiments of the present application, and are not intended to limit the scope of the present application. Under the inventive concept of the present application, any equivalent structural transformation made by using the contents of the description and drawings of the present application, or direct/indirect application in other related technical fields, are included in the scope of the present application.

What is claimed is:

1. A temperature detection device, comprising:

a probe head tube comprising a connection tube and a probe pin tube, wherein the probe pin tube comprises a shrunk section, a transition section and a cone-shaped section that are consequently connected, and the shrunk section is connected to the connection tube;

a circuit board provided with a limit part, wherein the circuit board is limited and provided in the connection tube by the limit part, and an end of the circuit board away from the probe pin tube is provided with a communication circuit;

a negative temperature coefficient (NTC) thermistor connected to an end of the circuit board facing the probe pin tube and located inside the transition section;

a holding tube made of ceramic and detachably provided at an end of the connection tube away from the probe pin tube; and an antenna electrically connected to the communication circuit and located inside the holding tube;

wherein a thickness of the sidewall of the cone-shaped section is greater than a thickness of the sidewall of the transition section or a thickness of the shrunk section; and the NTC thermistor is provided inside the transition section.

2. The temperature detection device according to claim 1, wherein the limit part comprises a first limit part, a second limit part and a third limit part; the first limit part, the second limit part and the third limit part are configured to limit the circuit board in a width direction, a thickness direction and a length direction of the circuit board, respectively.

3. The temperature detection device according to claim 2, wherein the first limit part is a first limit protrusion, and the third limit part is a third limit protrusion.

4. The temperature detection device according to claim 3, wherein the circuit board comprises a first circuit section and a second circuit section; the NTC thermistor is connected to the first circuit section, and the communication circuit is provided at the second circuit section; a width of the first circuit section is less than a width of the second circuit section; where the first circuit section and the second circuit section are connected is formed with the third limit protrusion; the first limit protrusion is provided at the first circuit section; a sum of a width of the first limit protrusion and the width of the first circuit section is less than an inner diameter of the connection tube; the width of the second circuit section is greater than the inner diameter of the connection tube.

5. The temperature detection device according to claim 4, wherein two sides of the first circuit section are both provided with one first limit protrusion, so that the first circuit section and an inner wall of the connection tube are spaced apart.

6. The temperature detection device according to claim 2, wherein the second limit part is configured as two first elastic sheets, and the two first elastic sheets are connected to two sides of the circuit board in the thickness direction, respectively; both the two first elastic sheets are configured to abut against an inner wall of the connection tube when the circuit board is provided inside the connection tube.

7. The temperature detection device according to claim 1, further comprising:

a thermal insulation rubber ring provided around the circuit board and located between the NTC thermistor and the communication circuit.

8. The temperature detection device according to claim 1, further comprising:

a positive screw;

wherein the positive screw is connected to an end of the holding tube away from the probe head tube, and the circuit board is provided with a charging circuit; and the positive screw is electrically connected to the charging circuit of the circuit board when the holding tube is installed to the probe head tube.

9. The temperature detection device according to claim 8, further comprising:

a contact pin;

wherein one end of the contact pin is provided with a first slot, and the other end of the contact pin is provided with a connection protrusion;

the circuit board is provided with a second slot, and an end of the positive screw facing the probe head tube is provided with a connection recess; and the first slot is inserted to the second slot to be electrically connected to the charging circuit, and the connection protrusion is configured to abut against a recess wall of the connection recess when the holding tube is installed to the probe head tube.

10. The temperature detection device according to claim 1, further comprising:

a main control circuit;

a first temperature sampling circuit; and a second temperature sampling circuit;

wherein the main control circuit, the first temperature sampling circuit and the second temperature sampling circuit are provided at the circuit board;

multiple NTC thermistors are provided, and the multiple NTC thermistors comprise a first NTC thermistor and a second NTC thermistor;

the first temperature sampling circuit is electrically connected to the main control circuit and the first NTC thermistor; and the second temperature sampling circuit is electrically connected to the main control circuit and the second NTC thermistor.

* * * * *